(12) United States Patent
Kim et al.

(10) Patent No.: US 7,750,993 B2
(45) Date of Patent: Jul. 6, 2010

(54) DISPLAY DEVICE USING LIGHT SOURCE AND EXTERNAL LIGHT AND HAVING DISPLAY UNIT HINGED WITH MAIN BODY

(75) Inventors: Kyong-wook Kim, Suwon-si (KR); Young-chol Lee, Gunpo-si (KR); Yoon-cheol Shin, Gangnam-gu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 688 days.

(21) Appl. No.: 11/657,539

(22) Filed: Jan. 25, 2007

(65) Prior Publication Data

US 2007/0171341 A1   Jul. 26, 2007

(30) Foreign Application Priority Data

Jan. 25, 2006   (KR) .................. 10-2006-0007880

(51) Int. Cl.
*G02F 1/1335* (2006.01)
*F21V 7/04* (2006.01)
*G09G 3/34* (2006.01)

(52) U.S. Cl. .................. 349/68; 349/12; 362/613; 345/102; 361/679.27; 361/679.28

(58) Field of Classification Search .......... 349/68, 349/114, 12; 361/679.27, 679.28
See application file for complete search history.

(56) References Cited

U.S. PATENT DOCUMENTS

| 5,408,388 A * | 4/1995 | Kobayashi et al. .......... 362/613 |
| 6,567,137 B1 * | 5/2003 | Moon .......................... 349/61 |
| 2005/0146651 A1 * | 7/2005 | Whitted et al. ............... 349/58 |

FOREIGN PATENT DOCUMENTS

| JP | 11-014984 A | 1/1999 |
| JP | 11-133236 A | 5/1999 |
| JP | 2000-250419 A | 9/2000 |
| KR | 1999-0072741 A | 9/1999 |
| KR | 10-2004-0035118 A | 4/2004 |

* cited by examiner

*Primary Examiner*—Michael H Caley
(74) *Attorney, Agent, or Firm*—Sughrue Mion, PLLC

(57) ABSTRACT

A display device using an external light, includes: a main body including a light source; at least one auxiliary light source; and a display unit. The display unit includes a first end hinged with the main body such that the display unit can be opened and closed. The display unit also includes a transmissive display panel which forms an image. When the display unit is open, external light is incident onto the display panel and light from the at least one auxiliary light source is selectively supplied to the display panel.

12 Claims, 5 Drawing Sheets

DISPLAY DEVICE USING LIGHT SOURCE AND EXTERNAL LIGHT AND HAVING DISPLAY UNIT HINGED WITH MAIN BODY

CROSS-REFERENCE TO RELATED PATENT APPLICATIONS

This application claims the benefit of Korean Patent Application No. 10-2006-0007880, filed on Jan. 25, 2006 in the Korean Intellectual Property Office, the disclosure of which is incorporated herein in its entirety by reference.

BACKGROUND OF THE INVENTION

1. Field of the Invention

Apparatuses consistent with the present invention relate to a display device using external light and more particularly, to a display device using an auxiliary light source together with natural light or illumination light to improve visibility.

2. Description of the Related Art

Due to the development of communication and display technologies, portable communication terminals have recently been developed. Examples of such communication terminals are personal digital assistants (PDA), portable multimedia players (PMP), and digital multimedia broadcasting (DMB) terminals. Liquid crystal displays (LCDs) are a type of light receiving flat panel display, which do not emit light by themselves but form an image by selectively transmitting illumination light radiated from a light source onto each pixel. Thus a backlight unit is installed behind a liquid crystal display device.

A backlight unit can be classified as a direct light type or an edge light type according to the arrangement of light sources. Direct light type backlight units include a plurality of lamps which are installed directly under a liquid crystal display and which emit light directly onto a liquid crystal panel. Direct light type backlight units may also include a light source that is efficiently installed on a broad surface and thus is appropriate for a large screen display device such as a 30-inch or greater LCD TV. Edge light type backlight units are appropriate for displays of portable terminals since their light sources are typically installed at a lateral side of a light guide panel.

Portable communication terminals are used in a wide variety of locations, and are often used outdoors in sunlight where the brightness of the screen may be relatively dark, thus decreasing the visibility of the display, and therefore reducing the portability of the portable communication terminals.

SUMMARY OF THE INVENTION

Exemplary embodiments of the present invention provide a display device using sunlight or illumination light as a light source to improve visibility and prevent visibility reduction due to external conditions, thereby improving the portability of the communication terminals and reducing the consumption power thereof.

According to an aspect of the present invention, there is provided a display device comprising: a main body comprising a light source; at least one auxiliary light source; and a display unit. The display unit comprises a first edge that is hinged with the main body such that the display unit can be opened and closed. The display unit also comprises a transmissive display panel which forms an image. When the display unit is open, external light is incident onto the display panel and light from the at least one auxiliary light source is selectively supplied to the display panel.

The main body may further comprise a light guide panel that directs light radiated from the light source toward the display unit.

The main body may further comprise a reflection panel disposed adjacent to the light guide panel, which re-reflects light from the light guide panel back through the light guide panel to the display unit.

The auxiliary light source may be disposed adjacent to a second edge of the display unit.

The main body may further comprise a brightness sensor which, when the display unit is open, detects an ambient brightness. The auxiliary light source may be turned on when a brightness detected by the brightness sensor is lower than a standard brightness.

The main body may further comprise a display position sensor which detects a position of the display unit. The light source is turned off when the display position sensor detects that the display unit is open.

The display unit may comprise a light guide panel which guides light from the light source toward the display panel.

According to another aspect of the present invention, there is provided a display device comprising: a main body; at least one auxiliary light source; and a display unit. The display unit comprises a first edge that is hinged with the main body such that the display unit can be opened and closed. The display unit also comprises a transmissive display panel which forms an image, a light source, and a light guide panel which guides light from the light source toward the display panel. When the display unit is open, external light is incident onto the display panel and light from the at least one auxiliary light source is selectively supplied from the auxiliary light source to the display panel.

According to another aspect of the present invention, there is provided a display device comprising: a main body; a light source; and a display unit. The display unit comprises an edge that is hinged with the main body such that the display unit can be opened and closed. The display unit also comprises a transmissive display panel which forms an image and a light guide panel that directs light from the light source to the display panel. When the display unit is open, the light source is selectively controlled according to a brightness of ambient light.

According to another aspect of the present invention, there is provided a display device comprising: a main body comprising a light guide panel; a light source; and a display unit. The display unit comprises an edge that is hinged with the main body such that the display unit can be opened and closed. The display unit also comprises a transmissive display panel which forms an image. When the display unit is open, external light is incident onto the display panel and light from the light source is selectively supplied to the display panel. When the display unit is closed, the light guide panel directs light from the light source to the display panel.

BRIEF DESCRIPTION OF THE DRAWINGS

The above and other exemplary aspects of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 1:
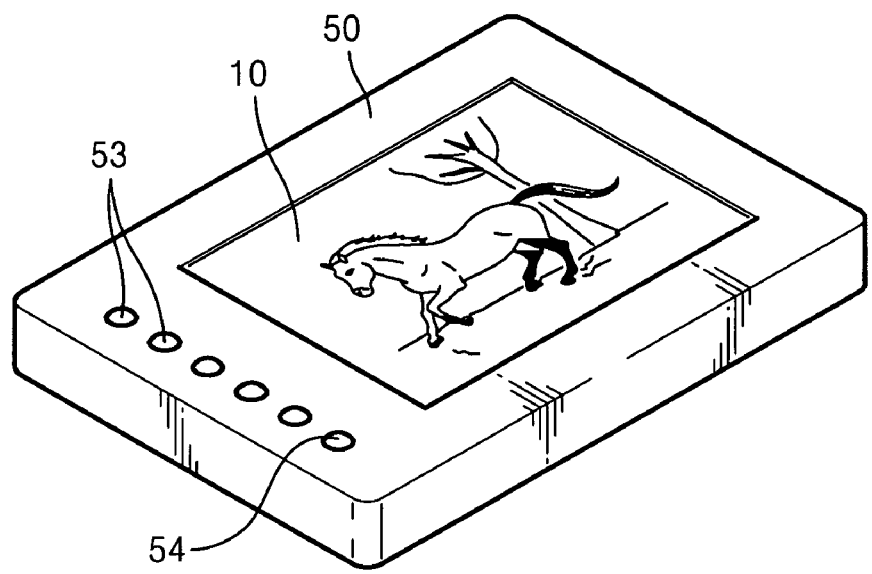
FIG. 1 is a perspective view of a display device according to an exemplary embodiment of the present invention.
Figure 2:
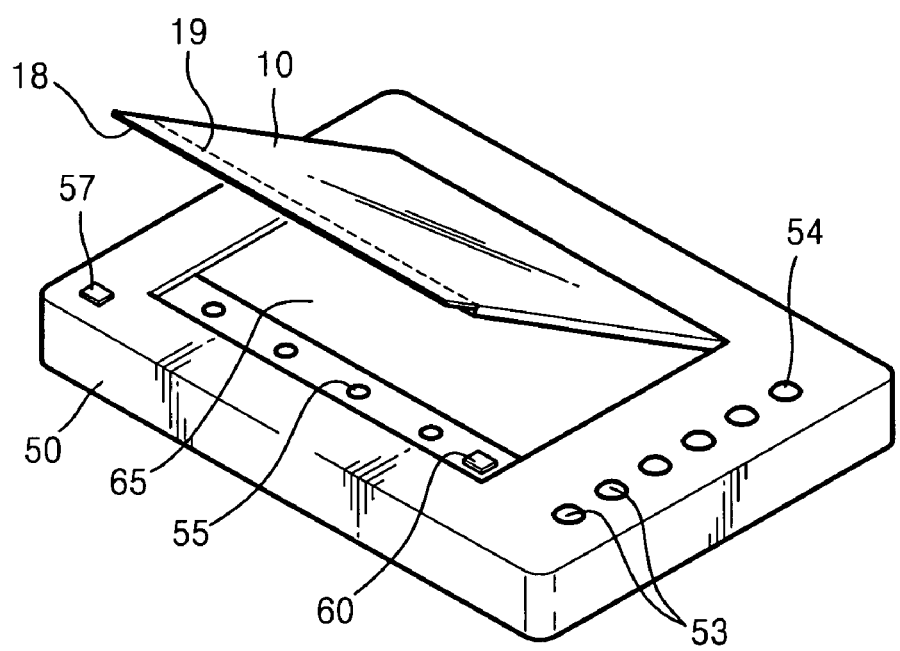
FIG. 2 is a perspective view of the display device of FIG. 1 with a display unit thereof opened according to an exemplary embodiment of the present invention.

FIG. 1 is a perspective view of a display device according to an embodiment of the present invention and FIG. 2 is a perspective view of the display device of FIG. 1 when a display unit 10 thereof is opened. The display device includes a main body 50 and the display unit 10 hinged with the main body 50 such that the display unit 10 can be opened and closed. When the display unit 10 is closed, the display device forms an image using an ordinary backlight unit and when the display unit 10 is opened, the display device forms an image using external light illuminated from the back of the display unit 10. The display device of the present embodiment includes an auxiliary light source 55 to improve visibility when forming an image using external light.

When the display unit 10 is opened, and thus external light from an external light source such as sunlight or an illumination light source is supplied to the back of the display unit 10, and an image is formed using the external light, if the brightness of the external light is insufficient for a predetermined standard brightness needed for forming an image, the auxiliary light source 55 is used to supply sufficient light to ensure visibility. Light may be insufficient from an external light source when using sunlight outdoors on a cloudy day or when an external indoor illumination light is blocked by a person or an obstacle. The auxiliary light source 55 may be selectively used according to the brightness of the external light.

Figure 3:
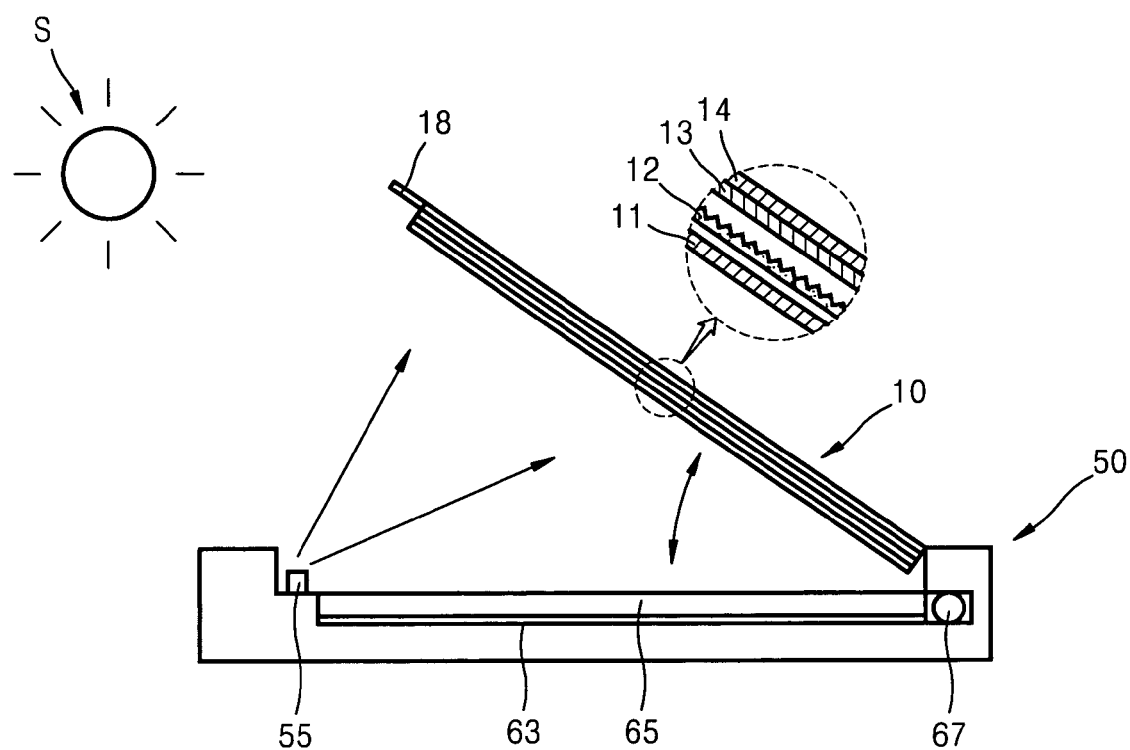
FIG. 3 is a cross-sectional view of the display device of FIG. 2 according to an exemplary embodiment of the present invention.

Referring to FIG. 3, the main body 50 includes a light source 67 and a light guide panel 65 which guides the light radiated from the light source 67 to the display unit 10. Also, the main body 50 further includes a reflection panel 63 that is disposed under the light guide panel 65 and reflects the light traveling through the light guide panel 65 to the display unit 10. A reference numeral 53 indicates input units.

The auxiliary light source 55 is disposed close to a free end of the display unit 10 inside the main body 50 to provide light to the back of the display unit 10 when the display unit 10 is opened. The auxiliary light source 55 is disposed outside the light guide panel 65 so as not to disturb the path of the light when the light is supplied to the display unit 10 via the light guide panel 65. When the display unit 10 is closed, a space for installing the auxiliary light source 55 is needed so that there is no gap between the display unit 10 and the light guide panel 65 due to the auxiliary light source 55. The auxiliary light source 55 is disposed inside the main body 50 and when the display unit 10 is closed, an accommodation portion 18 is formed in the display unit 10 in a corresponding position to the auxiliary light source 55 to accommodate the auxiliary light source 55.

An area 19 of the display unit 10 in a position corresponding to the auxiliary light source 55 is not part of a screen.

The auxiliary light source 55 may be a semiconductor light-emitting device or a cold cathode fluorescent lamp, or another light source as would be understood by one of skill in the art. When the auxiliary light source 55 is a semiconductor light-emitting device, a light-emitting window is obliquely disposed such that the light from the auxiliary light source 55 is radiated toward the display unit 10. This will be described in more detail with reference to FIG. 4. Also, though not illustrated in the drawings, an optical lens or a beam shaping diffuser may be further included in conjunction with the auxiliary light source 55 in order to uniformly supply light from the auxiliary light source 55 onto an entire surface of the display unit 10.

FIG. 3 is a cross-sectional view of the display device of FIG. 2 according to an embodiment of the present invention. As illustrated in FIG. 3, the display unit 10 includes a diffusion plate 11 which diffuses light, a first prism sheet 12 which corrects the light path, a second prism sheet 13 having prisms perpendicular to those of the first prism sheet 12, and a display panel 14 which forms an image by modulating light according to input image signals.

The first and second prism sheets 12 and 13 refract and focus the light from the diffusion plate 11 to straighten the light path, thereby increasing the brightness. The display panel 14 may be a liquid crystal panel and may form an image by modulating externally supplied light for each pixel.

The components of the display unit 10 are formed of a light transmissive material and thus light is transmitted through the display unit 10 and supplied to the display panel 14. In this way, the display panel 14 can form an image using the external light.

When the display unit 10 is combined with the main body 50, the light radiated from the light source 67 is guided through the light guide panel 65 and transmitted through the diffusion plate 11 and through the first and second prism sheets 12 and 13. An image is formed in the display panel 14 using the light that is transmitted through the first and second prism sheets 12 and 13. Meanwhile, in outdoor sunny conditions, or when there is illumination light indoors, the display unit 10 may be opened such that the external light is incident on the back of the display unit 10. When viewing a conventional display screen outdoors in sunlight, it is difficult to view the display screen because the brightness of the light source of the display is weaker than the sunlight. However, according to an embodiment of the present invention, when using sunlight as a light source, the display screen can be clearly viewed. Also, since a light source in the display device is not needed, power requirements for driving the light source can be reduced.

Also, when the external light is insufficient, visibility can be ensured using the auxiliary light source 55. The auxiliary light source 55 can be manually selected using a switch 54 on the main body 50. A first sensor 57 which senses the brightness of the external light may be further included in the main body 50 to control the auxiliary light source 55 according to the brightness of the external light. The first sensor 57 starts to operate when the display unit 10 is opened. When a brightness detected by the first sensor 57 is lower than a predetermined standard brightness required for forming an image, the auxiliary light source 55 is turned on, and when a brightness detected by the first sensor 57 is higher than the standard brightness, the auxiliary light source 55 is turned off. Moreover, the brightness of the auxiliary light source 55 can be controlled according to the brightness of the external light.

Since the light source 67 on the light guide panel 65 is not needed, it is turned off when the display unit 10 is opened. For this, the main body 50 may include a second sensor 60 which detects the position of the display unit 10, and when the second sensor 60 detects that the display unit 10 is open, the light source 67 is turned off. Also, the user can manually switch the light source 67.

According to the current embodiment of the present invention, the light guide panel 65 is included in the main body 50, as illustrated in FIG. 3. However, the light guide panel 65 may be also included in the display unit 10.

Figure 4:
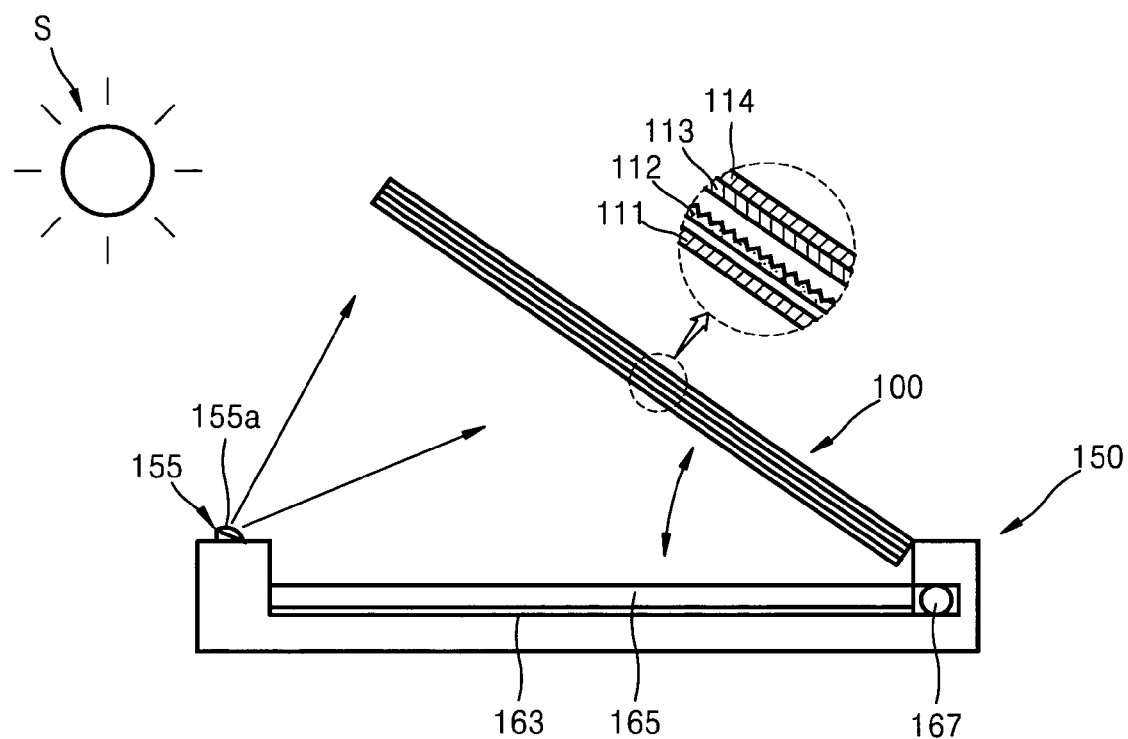
FIG. 4 is a cross-sectional view of a display device according to another exemplary embodiment of the present invention.

FIG. 4 is a cross-sectional view of a display device according to another embodiment of the present invention. Referring to FIG. 4, a display unit 100 is combined with a main body 150 such that the display unit 100 can be opened and closed and an auxiliary light source 155 is disposed outside of the main body 150. The main body 150 includes a reflection panel 163, a light guide panel 165, and a light source 167 which radiates light onto the light guide panel 165. The display unit 100 includes a diffusion plate 111, first and second prism sheets 112 and 113, and a display panel 114. When the auxiliary light source 155 is a semiconductor light-emitting device, a light-emitting window 155a may be obliquely disposed toward the display unit 100 such that the light from the auxiliary light source 155 is radiated toward the display unit 100.

Figure 5:
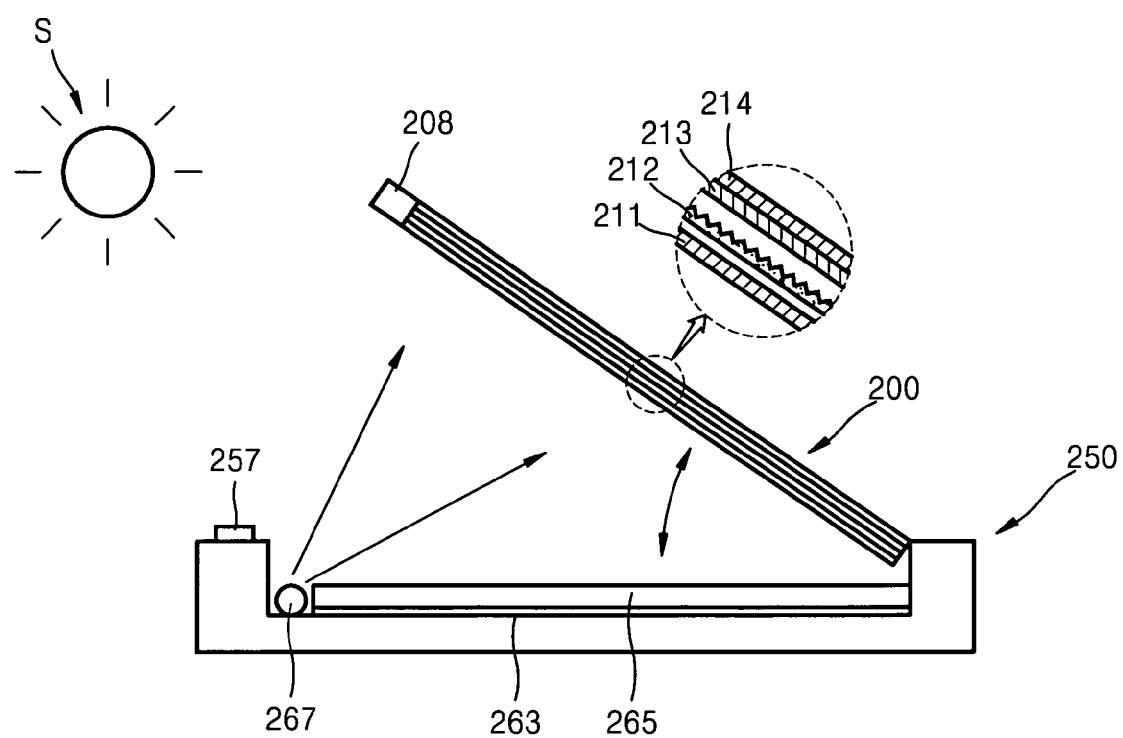
FIG. 5 is a cross-sectional view of a display device according to another exemplary embodiment of the present invention.

FIG. 5 is a cross-sectional view of a display device according to another embodiment of the present invention. Referring to FIG. 5, the display device includes a main body 250 and a display unit 200 that is hinged with the main body 250 such that the display unit 200 can be opened and closed and has a display panel 214 for forming an image. The main body 250 includes a light guide panel 265, a light source 267 radiating light to the light guide panel 265, and a reflection panel 263 that is disposed under the light guide panel 265 and reflects the light traveling through the light guide panel 265.

The display unit 200 includes a diffusion plate 211 diffusing incident light, first and second prism sheets 212 and 213, and a display panel 214.

In the present embodiment, the light source 267 radiates light to the light guide panel 265 and also supplies light to the display unit 200 together with external light when the display unit 200 is opened. In other words, the light source 267 can be used as a backlight and as an auxiliary light source and thus no additional auxiliary light source is needed. The light source 267 is disposed close to an unhinged end of the display unit 200 when the display unit 200 is flush with the main body 250. When the display unit 200 is flush with the main body 250, an area 208 of the display unit 200 does not contribute to a screen area of the display, unit 200.

The display device of the present embodiment may include a first sensor 257 which senses the brightness of the external light when the display unit 200 is opened. When the brightness of the external light is lower than a predetermined standard brightness required for forming an image, the light source 267 is turned on, and when the brightness of the external light is higher than the standard brightness, the light source 267 is turned off. Thus the light source 267 may be controlled according to the brightness of the external light. A switch to manually turn the light source on or off may also be included in the display device of the present embodiment.

When the display unit 200 is combined with the main body 250, light from the light source 267 is supplied to the display unit 200 through the light guide panel 265 and thus an image is formed in the display panel 214. When the display unit 200 is opened, sunlight or illumination light is supplied from the back of the display unit 200 and thus an image is formed in the display panel 214 using this external light. Meanwhile, when the external light is insufficient or visibility is poor due to other circumstances, uniform light can be supplied to the back of the display unit 200 using the light source 267 to provide a good quality image.

Figure 6A:
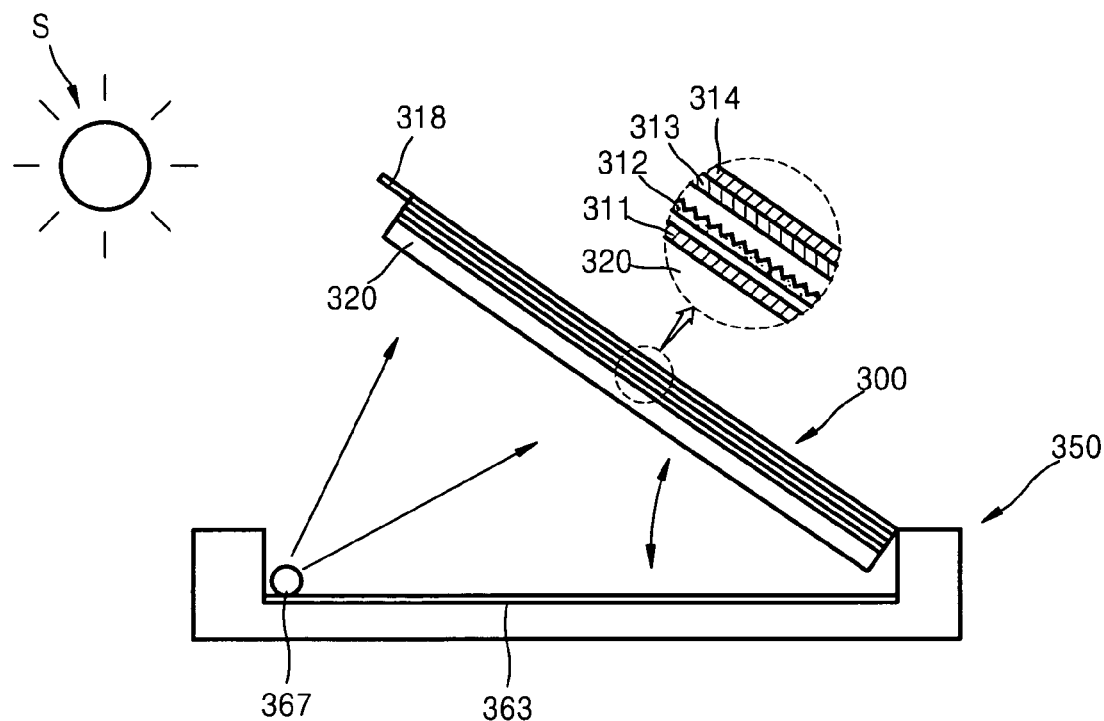
FIG. 6A is a cross-sectional view of a display device according to an exemplary embodiment of the present invention.
Figure 6B:
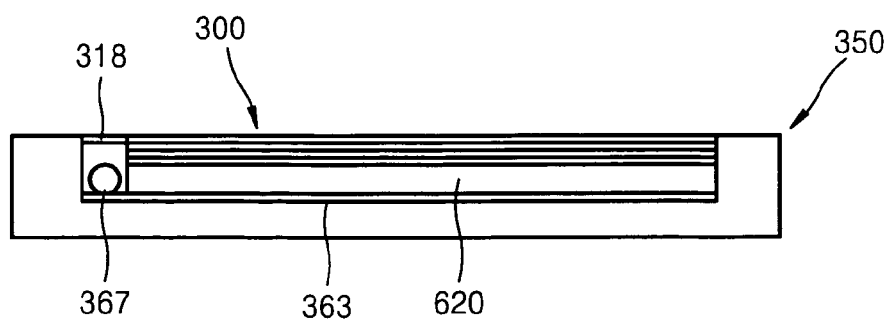
FIG. 6B is a cross-sectional view of the display device of FIG. 6A in which a display unit thereof is coupled with a main body of the display device.

FIG. 6A is a cross-sectional view of a display device according to an embodiment of the present invention, and FIG. 6B is a cross-sectional view of the display device of FIG. 6A, in which a display unit 300 thereof is in a closed position. Referring to FIG. 6A, the display device includes a main body 350, including a reflection panel 363, and a light guide panel 320, including the display unit 300. A light source 367 is disposed in the main body 350 and when the display unit 300 is closed, as illustrated in FIG. 6B, light is radiated from the light source 367 to the light guide panel 320. When the main body 350 is opened, light is radiated from the light source 367 to the back of the display unit 300. An accommodation unit 318 is formed at an unhinged end of the display unit 300 in a position corresponding to the light source 367. The display unit 300 includes a diffusion plate 311, first and second prism sheets 312 and 313, and a display panel 314 formed on the light guide panel 320.

Thus, according to an embodiment of the present invention, a light guide panel, a diffusion plate, first and second prism sheets, and a display panel in a display unit with a light guide panel can be manufactured in a single process.

As described above, a display device according to an exemplary embodiment of the present invention selectively uses external light such as sunlight or an illumination light, an auxiliary light, and a backlight to display an image. To prevent visibility reduction due to external conditions when sunlight or an external illumination light is used, an auxiliary light is used to maintain a regular brightness. Also, since no backlight is required, backlight power consumption can be saved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
   a main body comprising a light source;
   at least one auxiliary light source; and
   a display unit, comprising:
      a first edge hinged with the main body, such that the display unit can be opened and closed, and
      a transmissive display panel which forms an image;
   wherein, when the display unit is opened, external light is incident onto the display panel and light from the at least one auxiliary light source is selectively supplied to the display panel without using the light source and when the display unit is closed, light form the light source is supplied to the display panel without using the auxiliary light source.

2. The display device of claim 1, wherein the main body further comprises a light guide panel that directs light radiated from the light source toward the display unit.

3. The display device of claim 2, wherein the main body further comprises a reflection panel, disposed adjacent to the light guide panel, which re-reflects light from the light guide panel back to through the light guide panel to the display unit.

4. The display device of claim 2, wherein, when the display unit is closed, the auxiliary light source is disposed adjacent to a second edge of the display unit.

5. The display device of claim 4,
wherein the display unit further comprises an accommodation portion disposed corresponding to a position of the auxiliary light source; and
wherein when the display unit is closed, the auxiliary light source is accommodated by the accommodation portion.

6. The display device of claim 2, further comprising a display position sensor which detects a position of the display unit;
wherein the light source is turned off when the display unit is open.

7. The display device of claim 1, further comprising a brightness sensor which, when the display unit is open, detects an ambient brightness.

8. The display device of claim 7, wherein the auxiliary light source is turned on when an ambient brightness detected by the brightness sensor is lower than a standard brightness.

9. The display device of claim 1, wherein the display unit further comprises a diffusion plate, a first prism sheet, and a second prism sheet;
wherein the first and second prism sheets are disposed between the display panel and the diffusion sheet; and
wherein prisms of the first prism sheet are perpendicular to prisms of the second prism sheet.

10. A display device comprising:
a main body;
at least one auxiliary light source; and
a display unit, comprising:
a first edge hinged with the main body, such that the display unit can be opened and closed,
a transmissive display panel which forms an image,
a light source, and
a light guide panel which guides light from the light source toward the display panel;
wherein, when the display unit is opened, external light is incident onto the display panel and light from the at least one auxiliary light source is selectively supplied from the auxiliary light source to the display panel without using the light source and when the display unit is closed, light from the light source is supplied to the display panel without using the auxiliary light source.

11. The display device of claim 10, wherein the main body further comprises a reflection panel which, when the display unit is closed, is disposed adjacent to the light guide panel and re-reflects light from the light guide panel back through the light guide panel to the display unit.

12. The display device of claim 10, wherein, when the display unit is closed, the auxiliary light source is disposed adjacent to a second edge of the display unit.

* * * * *